United States Patent

Hildebrandt et al.

[11] Patent Number: 5,769,461
[45] Date of Patent: Jun. 23, 1998

[54] RELEASABLE CONNECTION ASSEMBLY FOR SUPPLY LINES IN A PRINTING MACHINE

[75] Inventors: Joerg Hildebrandt, Frankfurt am Main; Joachim Olek, Obertshausen; Herbert Schoppe, Neusass; Helmut Schild, Steinbach/Taunus, all of Germany

[73] Assignee: MAN Roland Druckmaschinen AG, Germany

[21] Appl. No.: 815,969

[22] Filed: Mar. 13, 1997

[30] Foreign Application Priority Data

Mar. 13, 1996 [DE] Germany .................. 196 09 737.1

[51] Int. Cl.⁶ .................................................. F16L 37/00
[52] U.S. Cl. ............................................. 285/29; 101/494
[58] Field of Search .............................. 101/494; 285/24, 285/25, 26, 27, 28, 29

[56] References Cited

U.S. PATENT DOCUMENTS

| 458,349 | 8/1891 | Greene | 285/24 |
|---|---|---|---|
| 945,158 | 1/1910 | Fontaine | 285/26 |
| 1,437,645 | 5/1922 | Genin | 285/25 |
| 5,333,691 | 8/1994 | Dean et al. | 285/26 |
| 5,417,459 | 5/1995 | Gray et al. | 285/26 |

FOREIGN PATENT DOCUMENTS 29 38 671  11/1982  Germany .
42 33 953  4/1994  Germany .

*Primary Examiner*—Edgar S. Burr
*Assistant Examiner*—Daniel J. Colilla
*Attorney, Agent, or Firm*—Leydig, Voit & Mayer, Ltd.

[57] ABSTRACT

A releasable connection assembly couples fluid supply lines in a printing machine with the use of first and second coupling parts. The first coupling part is part of a subassembly fastened to the printing machine frame and adapted for pivotal movement about the frame. The second coupling part is arranged on a movable assembly, such as a washing unit.

7 Claims, 3 Drawing Sheets

RELEASABLE CONNECTION ASSEMBLY FOR SUPPLY LINES IN A PRINTING MACHINE

FIELD OF THE INVENTION

The present invention generally relates to the printing art, and more particularly to an assembly used for releasable connection of fluid supply lines in a printing machine.

BACKGROUND OF THE INVENTION

Connection devices and assemblies used for coupling supply lines in a printing machine are generally known in the art. One example of such a device is described in German patent DE 29 38 671 C2. This connection assembly possesses two coupling parts for joining a washing unit with a supply line. A first coupling part is fixedly arranged on the washing unit and received in spaced side frames disposed on the washing unit. A second coupling part is located at the end of a supply line and is freely movable in such a way that it can be mated with the first coupling part.

Another German patent, DE 42 33 953 A1, discloses a washing unit which can be received in a linear guide provided by a suspension device fixed to the frame of a printing machine. The linear guide is disposed parallel to the axis of the printing machine cylinders. A first coupling part located on the washing unit can be mated with a second coupling part disposed on the suspension device by movement of the washing unit in a fixed, longitudinal direction with respect to the linear guide of the suspension device. The two coupling parts comprise a locking pin disposed on the washing unit and a complementary locking slot formed in the suspension device that together form an interlock. In the coupled position, the locking pin is mated with the locking slot. A biasing spring is arranged between the washing unit and A the suspension device for the purpose of damping the impact. The coupling parts are decoupled by moving the washing unit in a fixed direction away from the printing machine.

SUMMARY OF THE INVENTION

It is a general object of the invention to overcome the deficiencies of the prior art.

It is a more particular object of the invention to provide a device enabling the releasable connection of supply lines on a movable coupling part and on a coupling part arranged fixedly relative to the frame.

It is another object of the invention to provide a connection device for use in conjunction with supply lines in a printing machine that avoids complicated linear guide arrangements.

These and other objects are achieved with a connection assembly that permits releasable engagement of fluid supply lines within a printing machine. The connection assembly comprises first and second coupling parts that carry fluid supply lines and are cooperatively engaged in an interlocked position. The first coupling part is a component of a subassembly attached to the printing machine frame. The second coupling part is secured to a movable assembly disposed proximate to the printing machine such as, for example, a washing unit. The first coupling part is biased by a prestressed compression spring and is pivotable about a mounting point of connection fixed relative to the frame. The compression spring provides a bias force for retentive mated engagement of the coupling parts. In particular, the second coupling part includes a guide sleeve which is mated with a centering bolt extending outwardly from the first coupling part.

It is advantageous that the first coupling part is pivotally suspended from a fixed point of attachment with the use of a prestressed spring. This offers different degrees of freedom of movement of the coupling part in different directions of coordination. The relatively simple design is also advantageous since no complicated linear guides or other registering apparatus are required. The centering bolt ensures reliable centering, without tilting, and compensates for any offset in the position of the assembly to be coupled which may possibly be caused by movement of the first coupling part.

DETAILED DESCRIPTION OF THE INVENTION

Generally, the present invention relates to a releasable interlocking assembly used to connect fluid supply lines in a printing machine. This is particularly advantageous in places where ready access to the supply lines is rather difficult. The connection assembly is especially suitable for use in conjunction with fluid supply lines for washing units disposed to provide washing fluid to the printing machine. The assembly is also suitable for coupling or decoupling supply lines in other assemblies, for example, dampening and/or varnishing units, as well as for electrical supply units.

As noted above, the invention has particular application in a printing unit of a sheet-fed offset printing machine. Such machines comprise an impression cylinder which is operatively interconnected with a rubber-blanket cylinder and also to a plate cylinder associated with the rubber-blanket cylinder as will be understood by those skilled in the art. The plate cylinder typically supports an inking unit and, where appropriate, a dampening unit.

Figure 3:
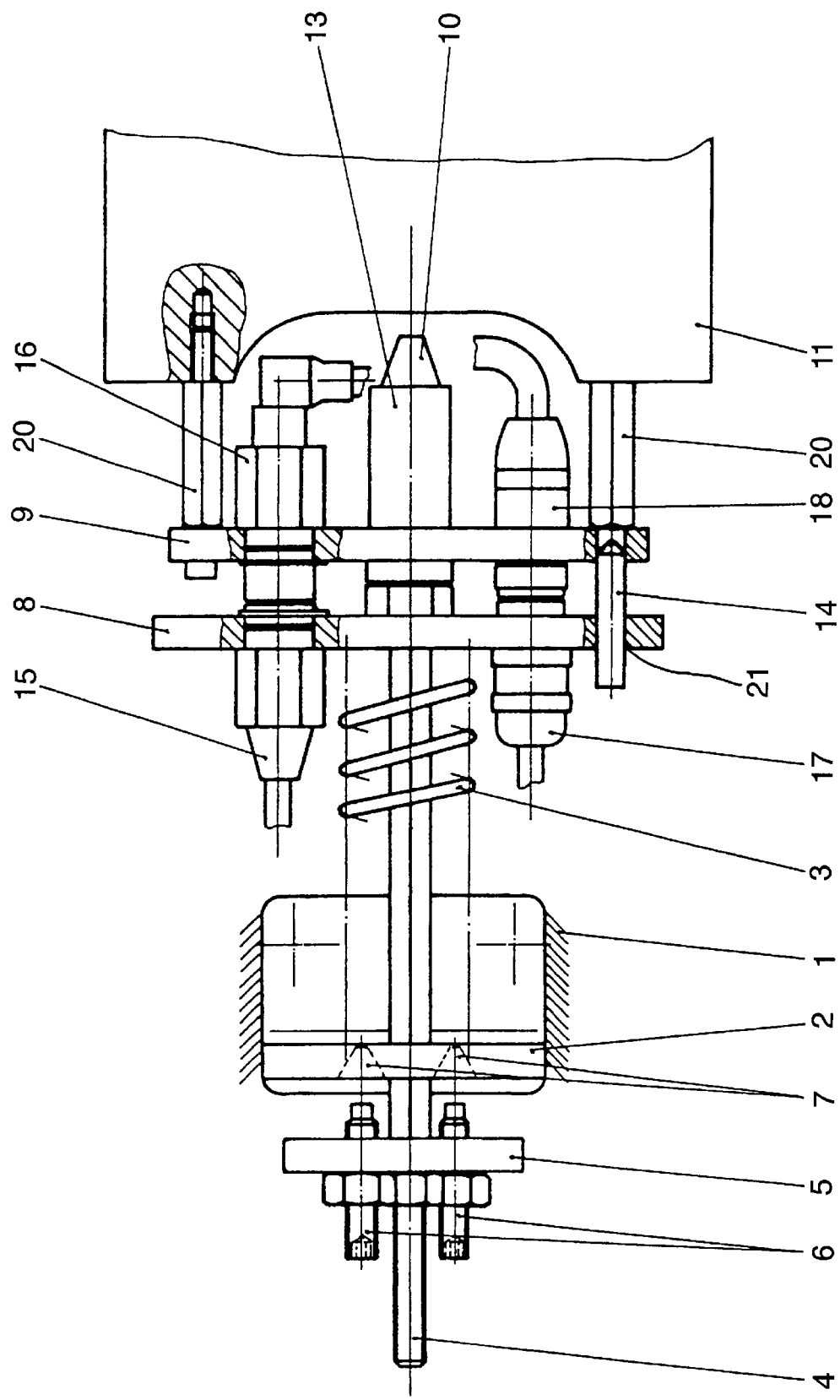
FIG. 3 is a top view of the connection assembly of FIGS. 1 and 2 shown in the coupled position.

As shown in FIG. 3, the invention is especially useful for connecting a washing unit or assembly 11 to a printing machine underneath the impression cylinder of the printing machine. The washing unit is typically required to supply washing fluid to the impression cylinder. In this application, the space beneath the impression cylinder is confined. Accordingly, the washing assembly 11, and in particular, fluid supply lines 16, 18 disposed to deliver washing agent and water as well as for electrical connection (no reference number), must be automatically releasably connected to complementary fluid supply lines 15, 17 of the printing machine. Reliable coupling of the supply lines 15 through 18 is necessary for a reliable washing operation. At the same time, the supply lines 15 through 18 must be capable of being uncoupled, since the washing unit must be routinely removed from the printing machine for cleaning or maintenance.

In accordance with the invention, a releasable connection assembly is provided which includes a first pivotable connection subassembly adapted for mating engagement with a second connection device. In the described embodiment, fluid supply lines 15, 16 and 17, 18 are releasably connected to one another with first and second spaced plate-like coupling parts or elements 8, 9. The first connection subassembly is secured to a printing machine frame 1 with the use of a support 2 (shown in cross section in FIGS. 1 and 2).

In keeping with the invention, the first connection subassembly is secured to the printing frame such that it provides various orientations for connection. In this regard, the first connection subassembly includes the first coupling element 8, and a centering bolt 10 projecting outwardly along a longitudinal axis A toward the second coupling element 9. The centering bolt 10 preferably has a lathe-turned groove 10*g* which joins a conical end 10*e* and a crowned centering means 10*c*. The centering bolt 10 is in axial alignment with a second bolt 4 which is also secured at one end to the first coupling element 8. The second bolt 4 extends along the axis A in a direction opposite to the centering bolt 10. The opposite end of the second bolt 4 passes through an opening 28 formed in the support 2.

For effecting interlocking engagement of the coupling arrangement, a biasing means is provided to urge the first coupling element 8 and centering bolt 10 toward an interlocked position. In this regard, the second bolt 4 is surrounded concentrically by a compression spring 3. The compression spring 3 is secured at one end to the coupling part 8. The opposite end of the spring 3 is received within an opening formed in the support 2 fixed relative to the frame. In the illustrated embodiment, the biasing spring 3 is prestressed at least with a necessary coupling force sufficient to prevent leakage of the fluid supply lines when the coupling arrangement is in the interlocked position. A stop 5 having a plurality of adjusting elements such as elements 6 is secured to the distal end of the bolt 4. In the coupled position, the adjusting elements 6 are moved into abutment with a complemental centering arrangement such as depressions 7 disposed in the support 2 (see FIG. 3).

The second coupling element 9 has an annular guide sleeve 13 disposed to receive the centering bolt 10 in the interlocked position. The coupling element 9 and guide sleeve 13 are secured to the washing unit 11 with the use of connecting elements such as bolts 20. The second coupling element 9 also receives the supply lines 16, 18. Similarly, the first coupling element 8 receives the corresponding supply lines 15, 17. As seen in FIG. 3, the second coupling element 9 also includes a registering pin 14 which projects outwardly from the second element 9 and is adapted to be received in an opening 21 formed in the first coupling element 8.

Figure 1:
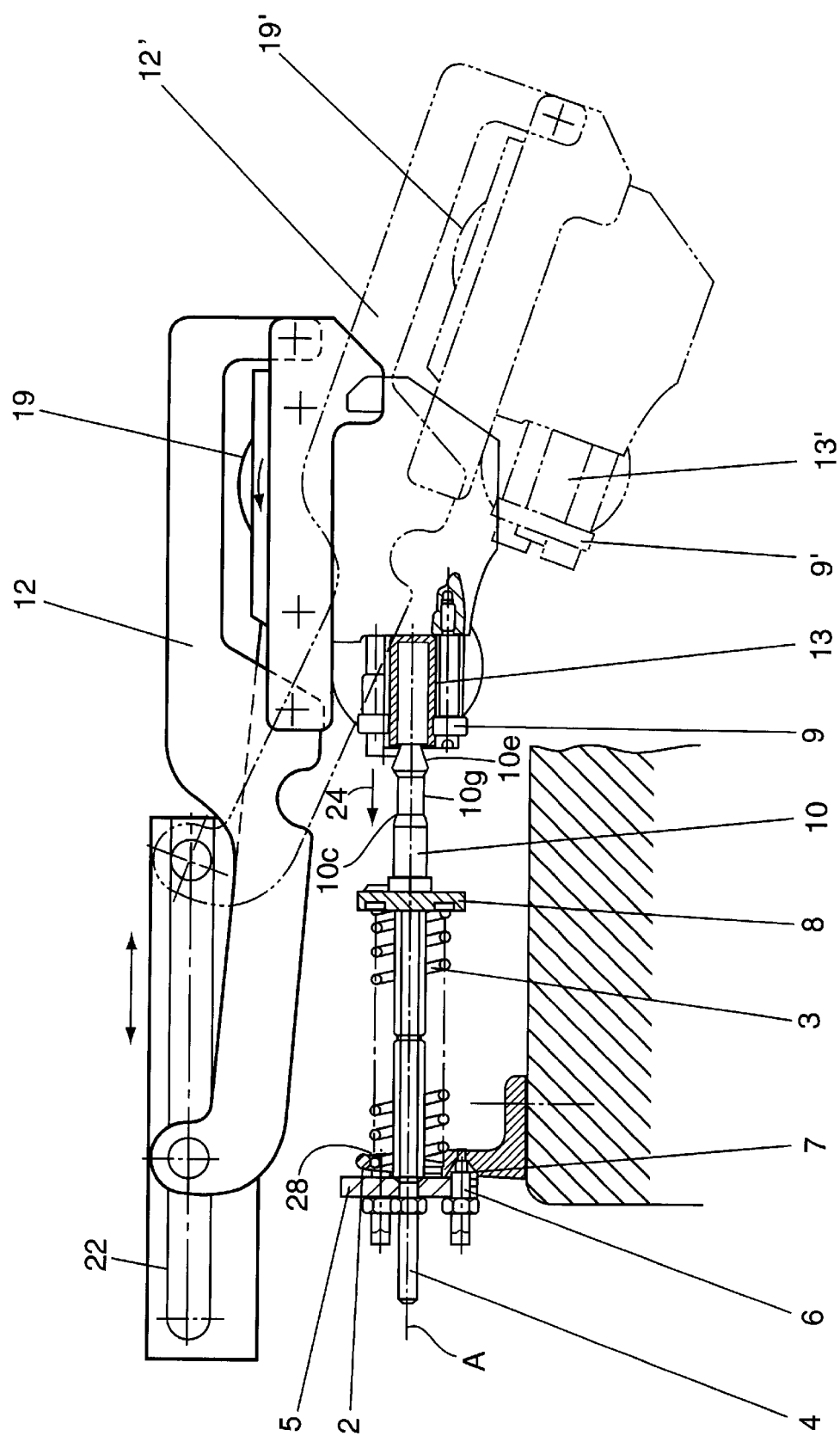
FIG. 1 is a side view of a releasable connection assembly according to the invention including first and second coupling parts shown in a decoupled position.
Figure 2:
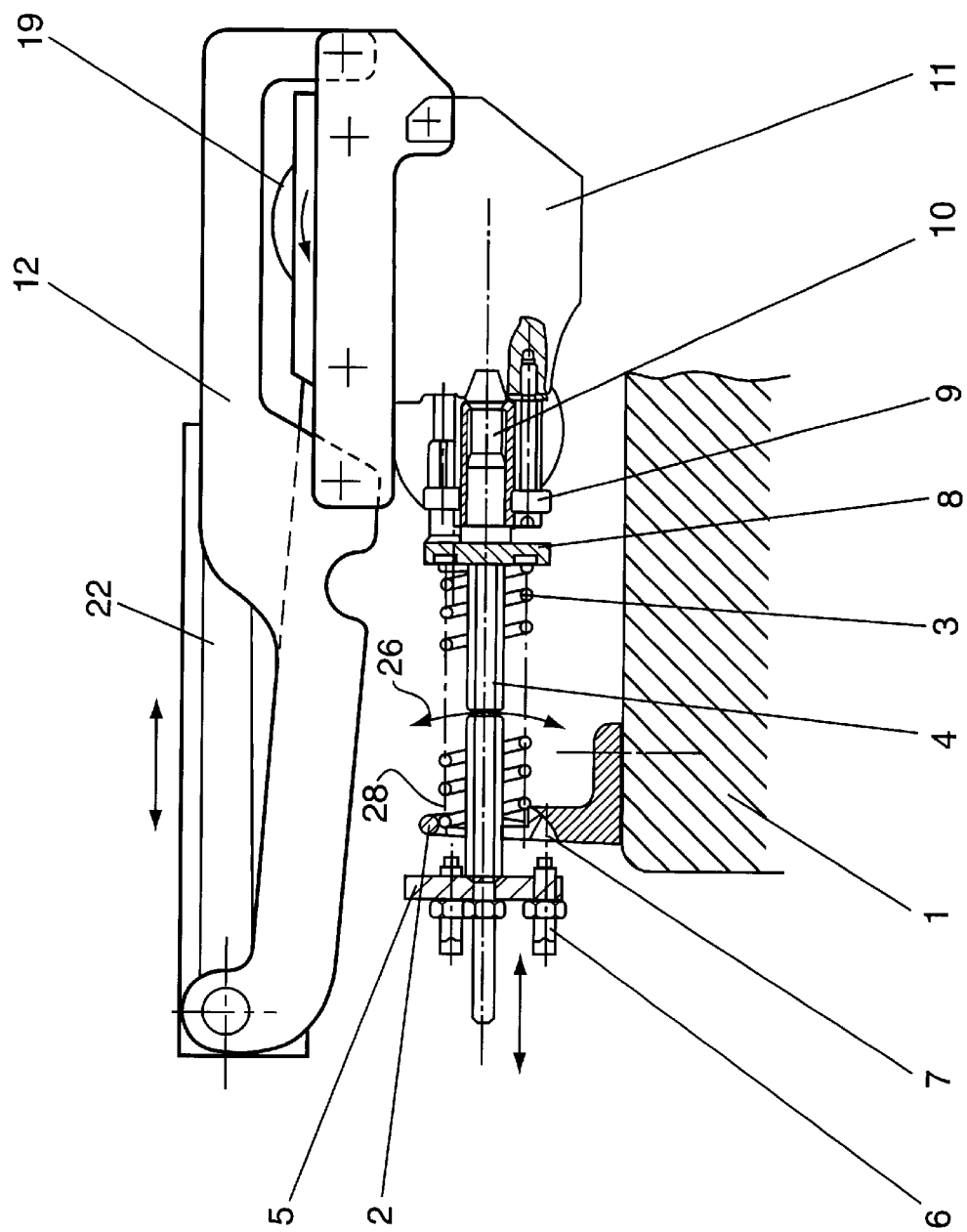
FIG. 2 is a side view of the releasable connection assembly of FIG. 1 shown in a coupled position.

The unit 11 is shown as a washing device with an actuating arm 12. As shown in FIGS. 1 and 2, the unit includes a rotary washing brush 19 which, together with the washing unit 11, is placed on the impression cylinder (not shown) as desired.

In order to move the connection assembly from the uncoupled position (FIG. 1) to the coupled position, the actuating arm 12 is urged along a guide 22 from a first position (shown in phantom as the arm 12', coupling part 9' and guide sleeve 13' in FIG. 1) into a second position of readiness denoted by the position of the arm 12, coupling part 9, and guide sleeve 13 in FIG. 1. The arm is then urged from the position of readiness (uncoupled position) to the position shown in FIG. 2 in order to effect coupling of the arrangement. This action, in turn, urges the coupling part 9 and the annular sleeve 13 in the direction the arrow 24 shown in FIG. 1. In the described embodiment, the arm 12 is activated by means of working cylinders or the like.

The washing unit 11 is moved by actuation of the arm 12 toward the first coupling part 8. During the coupling operation, the centering bolt 10 together with the coupling part 8 and the bolt 4 is displaced by the guide sleeve 13 together with the coupling part 9 in the direction of the support 2 to counteract the force of the compression spring 3. At the same time, the bolt 4 together with the stop 5 and adjusting elements 6 are urged from the complemental depressions in the support 2. That is, each adjusting element 6 is urged away from the corresponding centering means 7. The coupling part 8 is consequently freed and is supported only at the end of the compression spring 3 in the mounting of the support 2. The coupling part 8 is thereby freely movable and may be readily oriented to compensate for any possible offset in the position of the coupling part 9 shown by the arrow 26 in FIG. 2.

As noted above, the coupled position is illustrated in FIG. 2. The centering bolt 10 has penetrated into the annular guide sleeve 13 and thus properly positions the coupling parts 8, 9. In the coupled state, the registering pin 14 passes through the second coupling part 9, thereby additionally affording a safeguard against relative rotation or movement.

In order to decouple the supply lines 15, 16 and 17, 18, the washing unit arm 12 is moved back into the position of readiness by means of working cylinders. The guide sleeve 13 slides out of the coupled connection with the centering bolt 10 and the compression spring 3 is relaxed. The stop 5 and adjusting element 6 with centering means 7 halts axial travel of the coupling part 8 in its uncoupled position on the support 2. The assembly 11 returns to its position of readiness. During coupling, the supply lines are opened automatically in the end position as will be understood by those skilled in the art. During uncoupling, they are closed automatically.

From the foregoing, it will be seen that a connection device meeting the aforestated objectives has been described. The invention enables quick and precisely oriented coupling and decoupling of supply lines with the need for mounting of additional guide apparatus. Various modifications and alternative constructions may be made to the invention which has been described above in terms of a preferred embodiment. It should be understood, of course, that there is no intention to limit the invention to the specific form described herein. Rather, the intention is to cover all modifications, alternative constructions and equivalents falling within the spirit and scope of the invention.

What is claimed is:

1. An assembly for the releasable connection of fluid supply lines in a printing machine having a fixed frame and fluid supply lines of a movable unit disposed proximate to the fixed frame, the assembly comprising:

a support having an opening attached to the fixed frame;

a first coupling subassembly including a first coupling element, a centering bolt secured to the first coupling element projecting outwardly along a longitudinal axis, a second bolt secured to the first coupling element extending opposite to the centering bolt and having a distal end passing through the opening formed in the support, a compression spring concentrically surrounding the second bolt attached to the support at one end to provide a point of connection and attached to the first coupling element at its other end, and a stop with at least one adjusting device attached to the distal end of the second bolt, the first coupling subassembly being adapted for pivotal movement about the point of connection; and a second coupling element disposed on the movable unit having a guide sleeve which is matingly engageable with the centering bolt to effect coupling of the fluid supply lines.

2. The invention as in claim 1 wherein the second coupling element is secured on a washing unit.

3. The invention as in claim 1 further comprising centering means disposed on the support adapted for cooperative engagement with the adjusting element when the assembly is in an unmated position.

4. The invention as in claim 1 wherein the stop further includes an adjusting element that can be fixed at a position relative to the support when the assembly is in an unmated position.

5. The invention as in claim 4 further including centering means disposed in the support and wherein the stop and the adjusting element are separated from the centering means when the assembly is in a mated position.

6. The invention as in claim 1 wherein the second coupling element further comprises a registering pin disposed to be received within an orifice formed in the first coupling element as a safeguard against relative rotation when the assembly is in a mated position.

7. An quick-connect assembly for coupling fluid supply lines in a printing machine with supply lines disposed on a unit disposed proximate to the machine, the assembly comprising:

a first coupling subassembly attached to the printing machine, the first subassembly including a first plate-like coupling element with supply lines from the printing machine secured thereto, a centering bolt secured to the first coupling element projecting outwardly along a longitudinal axis, and biasing means joined with the first coupling element and being pivotally connected to the printing machine frame about a point of connection to permit orientation of the first coupling subassembly when the assembly is moved from a decoupled position to a coupled position; and a second coupling element disposed on the unit having supply lines from the unit and a guide sleeve located thereon, the second coupling element and the guide sleeve being movable toward the first coupling subassembly to effect mating engagement of the centering bolt with the sleeve and of the supply lines of the printing machine with the supply lines of the unit when the assembly is in the coupled position.

\* \* \* \* \*